US012752715B2

(12) United States Patent
Voss et al.

(10) Patent No.: US 12,752,715 B2
(45) Date of Patent: Oct. 6, 2026

(54) ADJUSTABLE FASTENING SYSTEM

(71) Applicant: RSI North America, Inc., Fort Worth, TX (US)

(72) Inventors: Michael Voss, Fort Worth, TX (US); Jozua Joubert, Benbrook, TX (US)

(73) Assignee: RSI North America, Inc., Fort Worth, TX (US)

( * ) Notice: Subject to any disclaimer, the term of this patent is extended or adjusted under 35 U.S.C. 154(b) by 346 days.

(21) Appl. No.: 18/524,478

(22) Filed: Nov. 30, 2023

(65) Prior Publication Data

US 2025/0178541 A1 Jun. 5, 2025

(51) Int. Cl.
*B60R 9/10* (2006.01)
*B60R 9/045* (2006.01)
*B60R 9/058* (2006.01)

(52) U.S. Cl.
CPC ................ *B60R 9/10* (2013.01); *B60R 9/045* (2013.01); *B60R 9/058* (2013.01)

(58) Field of Classification Search
CPC ............ B60R 9/10; B60R 9/045; B60R 9/058
See application file for complete search history.

(56) References Cited

U.S. PATENT DOCUMENTS 7,975,888 B2 * 7/2011 Settelmayer .............. B60R 9/06 224/497
9,156,413 B2 * 10/2015 Liu ...................... B25H 1/0014
10,086,768 B2 * 10/2018 Ritter, Jr. .................. B60R 9/10
10,363,982 B1 * 7/2019 Parsons ....................... B62J 9/26
11,059,428 B1 * 7/2021 Weil ......................... B60R 9/045
11,945,412 B1 * 4/2024 Brusselback ............. B60R 9/10
12,103,627 B2 * 10/2024 de Brun ............... B60Q 1/2661
12,409,788 B1 * 9/2025 Wang ......................... B60R 9/10
12,409,789 B1 * 9/2025 Wang ......................... B60R 9/10
2005/0258209 A1 * 11/2005 Wang ......................... B60R 9/10 224/500
2006/0249466 A1 * 11/2006 Wang ....................... B62H 3/02 211/17
2007/0057001 A1 * 3/2007 Wang ......................... B60R 9/06 224/570
2007/0164065 A1 * 7/2007 Davis ......................... B60R 9/10 224/324
2007/0235487 A1 * 10/2007 Bogoslofski .............. B60R 9/06 224/533
2008/0093404 A1 * 4/2008 Clausen ..................... B60R 9/06 224/519
2009/0120986 A1 * 5/2009 Sautter ....................... B60R 9/06 224/532
2013/0181022 A1 * 7/2013 Bogoslofski .............. B60R 9/10 224/250
2015/0115011 A1 * 4/2015 Wang ...................... B60R 9/048 224/568
2020/0224690 A1 * 7/2020 Voss ....................... F16B 5/0642
(Continued)

FOREIGN PATENT DOCUMENTS

DE 10215971 A1 * 11/2003 ............. B60R 9/045
FR 2782042 A1 * 2/2000 ............... B60R 9/10

*Primary Examiner* — Brian D Nash
(74) *Attorney, Agent, or Firm* — K&L Gates LLP

(57) ABSTRACT

A fastening system is provided. The fastening system includes a base portion having an upper portion and a lower portion and an insert. The insert includes a plurality of notches configured to slidably engage a plurality of channels of the base portion.

12 Claims, 8 Drawing Sheets

(56) References Cited

U.S. PATENT DOCUMENTS

| | | | | |
|---|---|---|---|---|
| 2020/0236799 | A1* | 7/2020 | Roth | H04B 1/3888 |
| 2022/0178395 | A1* | 6/2022 | Mills | F16B 5/0208 |
| 2022/0381277 | A1* | 12/2022 | Stanton | F16B 12/20 |
| 2023/0035602 | A1* | 2/2023 | Voss | E05B 13/10 |
| 2023/0202403 | A1* | 6/2023 | Wang | B60R 9/10<br>224/549 |
| 2023/0331171 | A1* | 10/2023 | Wronski | B60R 9/06 |
| 2023/0365068 | A1* | 11/2023 | Taylor | B60R 9/06 |
| 2023/0398948 | A1* | 12/2023 | Li | B60R 9/10 |
| 2024/0278730 | A1* | 8/2024 | Voss | B60R 9/045 |
| 2025/0115318 | A1* | 4/2025 | Teague | B62H 3/08 |

* cited by examiner

ADJUSTABLE FASTENING SYSTEM

BACKGROUND

The present disclosure generally relates to an adjustable fastening system for various applications. In one example, the fastening system of the present disclosure may be applied to a bicycle rack for a vehicle, and particularly for an automobile. A bicycle rack, also known as a bicycle carrier, is a device attached to a vehicle such as a car, truck, or bus to which bicycles can be mounted for transport. Various designs and configurations have been developed over the years. Some bicycle racks are configured to secure bicycles above the roof of the vehicle, while others secure bicycles behind the vehicle. Some bus mounted bicycle racks are attached to the front of a bus. Referring specifically to automobiles (not including buses), bicycle racks are typically configured to be attached to the roof, rear trunk, rear tow hitch, or the rear of a truck bed, depending on the design and the automobile. However, with the differing shapes and sizes of bicycles, many fastening systems are unable to properly secure the bicycle to the vehicle. Thus, a user may be required to replace the fastening system for proper security.

SUMMARY

In light of the disclosure herein and without limiting the disclosure in any way, in a first aspect of the present disclosure, which may be combined with any other aspect listed herein unless specified otherwise, a fastening system includes a base portion having an upper portion and a lower portion; and an insert. The insert includes a plurality of notches configured to slidably engage a plurality of channels of the base portion.

In accordance with a second aspect of the present disclosure, which may be used in combination with any other aspect listed herein unless stated otherwise, the fastening system further includes a strap having a first aperture on a first end and a second aperture on a second end.

In accordance with a third aspect of the present disclosure, which may be used in combination with any other aspect listed herein unless stated otherwise, the base portion further includes a first notch and a second notch. The first notch is configured to engage the first aperture of the strap, and the second notch is configured to engage the second aperture of the strap.

In accordance with a fourth aspect of the present disclosure, which may be used in combination with any other aspect listed herein unless stated otherwise, the first notch and the second notch are disposed on the upper portion of the base portion.

In accordance with a fifth aspect of the present disclosure, which may be used in combination with any other aspect listed herein unless stated otherwise, an aperture extends through the lower portion of the base portion.

In accordance with a sixth aspect of the present disclosure, which may be used in combination with any other aspect listed herein unless stated otherwise, the fastening system is configured to secure a bicycle to a bicycle rack.

In accordance with a seventh aspect of the present disclosure, which may be used in combination with any other aspect listed herein unless stated otherwise, the bicycle rack includes a pair of elongated members, a plurality of connecting elements for slidably connecting the pair of elongated members to a roof of a vehicle, and a pair of telescopic arms. Each one of the telescopic arms includes a first end connected to a respective one of the pair of elongated members, and the bicycle rack can be adjusted between a stored position and a bicycle carrying position.

In accordance with an eighth aspect of the present disclosure, which may be used in combination with any other aspect listed herein unless stated otherwise, in the stored position, the pair of elongated members is positioned on top of the roof and the pair of telescopic arms is retracted.

In accordance with a ninth aspect of the present disclosure, which may be used in combination with any other aspect listed herein unless stated otherwise, in the bicycle carrying position, a section of each one of the pair of elongated members extends beyond the roof, such that a bicycle receiving end region receives the bicycle, and the pair of telescopic arms extend downwardly to permit a rack securing element to mate with an external surface of the vehicle below the roof.

In accordance with a tenth aspect of the present disclosure, which may be used in combination with any other aspect listed herein unless stated otherwise, the roof of the vehicle is a roof of a vehicle canopy.

In accordance with an eleventh aspect of the present disclosure, which may be used in combination with any other aspect listed herein unless stated otherwise, the bicycle rack when in the stored position, is clear of a rear storage compartment of the vehicle.

In accordance with a twelfth aspect of the present disclosure, which may be used in combination with any other aspect listed herein unless stated otherwise, each one of the pair of elongated members are tubes.

In accordance with a thirteenth aspect of the present disclosure, which may be used in combination with any other aspect listed herein unless stated otherwise, the plurality of connecting elements are a plurality of guides having a clamping portion for clamping each one of the plurality of guides to a rail and a guiding section, which slidably receives one of the pair of elongated members.

In accordance with a fourteenth aspect of the present disclosure, which may be used in combination with any other aspect listed herein unless stated otherwise, the external surface is a rear door handle.

In accordance with a fifteenth aspect of the present disclosure, which may be used in combination with any other aspect listed herein unless stated otherwise, the bicycle rack is configured to receive two bicycles.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

DETAILED DESCRIPTION

The following description is provided as an enabling teaching of the present disclosure, is illustrative of principles associated with the present disclosure, and is not intended to limit the scope. Changes may be made to the embodiments depicted and described, while still attaining results of the present disclosure and/or without departing from the scope of the present disclosure. Furthermore, it will be understood that some results or advantages of the present disclosure may be attained by selecting some of the features of the present disclosure without utilizing other features. Accordingly, those skilled in the art will recognize that modifications and adaptations to the present disclosure may be possible and may even be desirable in certain circumstances, and may form part of the present disclosure.

Figure 1:
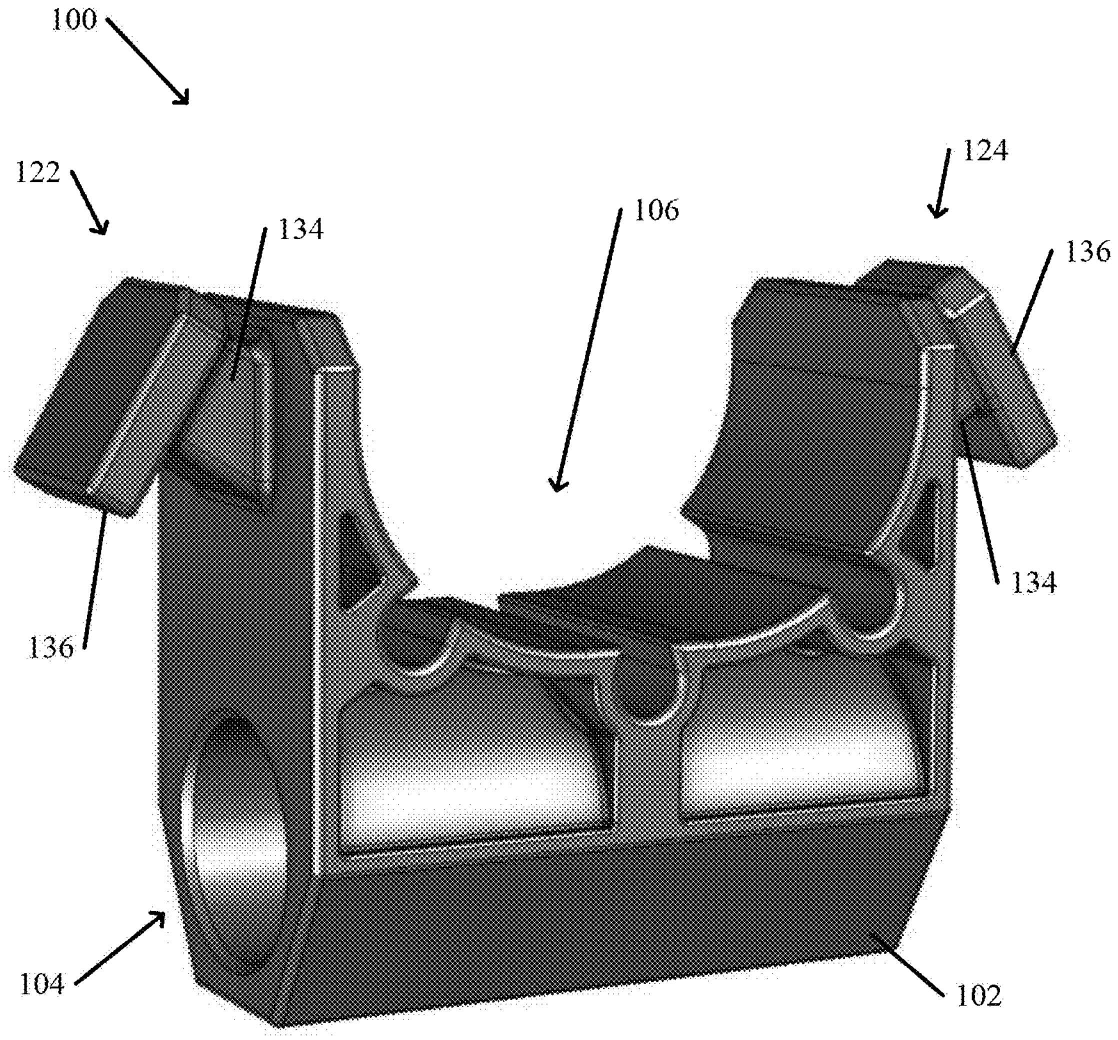
FIG. 1 is a perspective view of an example embodiment of a fastening system according to the present disclosure.

FIG. 1 is a perspective view of an example embodiment of a fastening system according to the present disclosure. The fastening system 100 is configured to secure various items of differing sizes. As shown in FIG. 1, the fastening system 100 includes a base portion 102. The base portion 102 includes an aperture 104 and a receiving portion 106. In FIG. 1, the aperture 104 is located on a lower portion of the base portion 102 while the receiving portion 106 is located on the upper portion of the base portion 102. In an example embodiment, the receiving portion 106 is concave and configured to receive an item of complementary shape. Thus, while the receiving portion 106 is approximately a semi-circle in FIG. 1, it should be appreciated that the receiving portion 106 can be altered to any of number of desired shapes. In one example, the receiving portion 106 may be altered to match the cross-sectional area of the item. By matching the cross-sectional area, the item may fully contact the receiving portion 106 of the fastening system 100, which may provide increased security and safety.

The fastening system may further include a first protruding notch 122 and a second protruding notch 124. Each protruding notch 122, 124 extends from the base portion 102. Further, each protruding notch 122, 124 includes a shaft portion 134 coupled to a platform 136. As described in more detail below, the configuration of each protruding notch 122, 124 allows a user to more fully secure an item to the receiving portion 106 of the base portion 102. In one example, each protruding notch 122, 124 engages a strap, which can wrap around the item, providing added security. Such configuration allows a user to easily attach or remove the strap from the protruding notches 122, 124 to release or secure the item to the fastening system 100.

Figure 2:
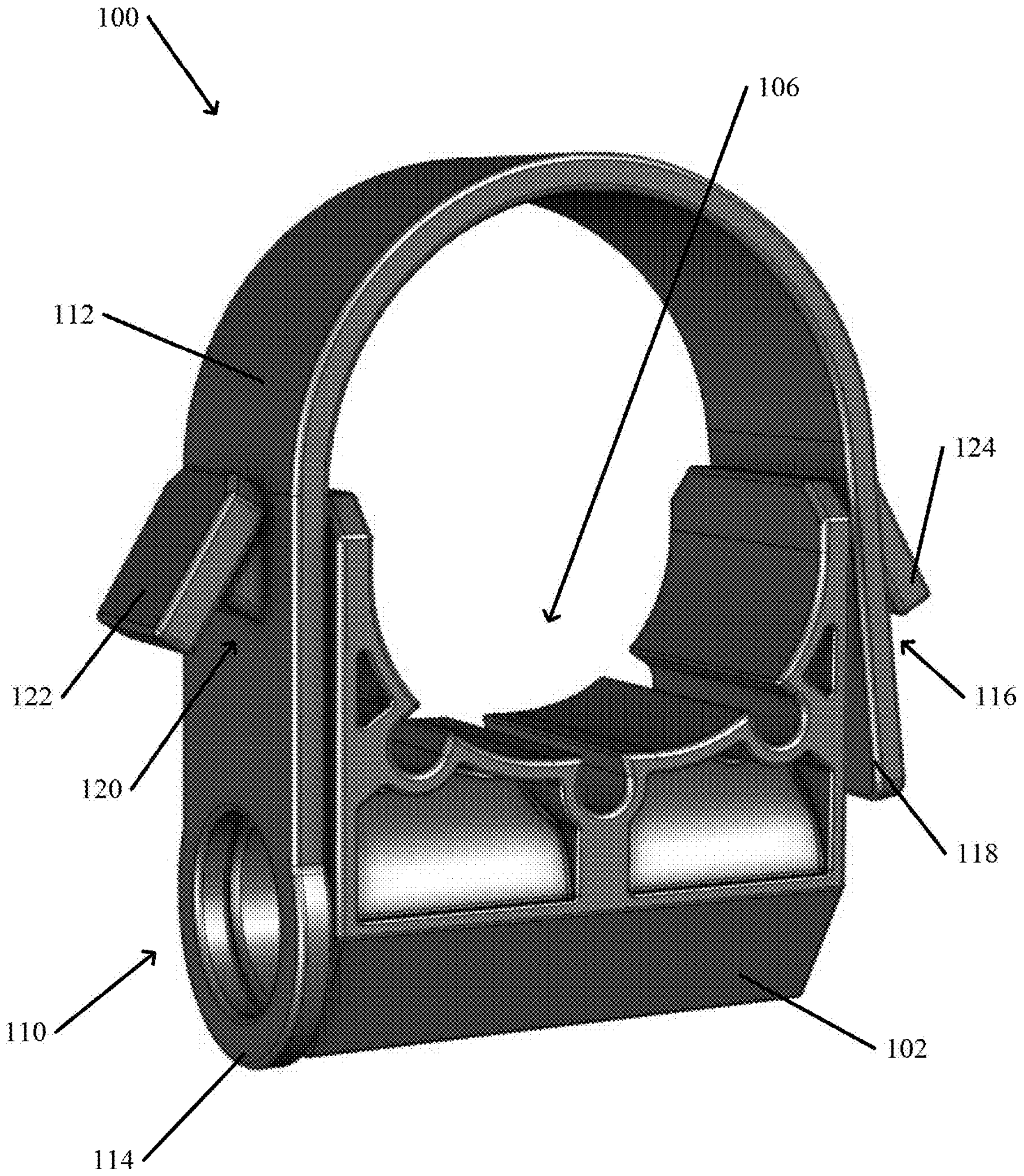
FIG. 2 is a perspective view of an example embodiment of a fastening system having a strap according to the present disclosure.

FIG. 2 is a perspective view of an example embodiment of a fastening system having a strap according to the present disclosure. As shown in FIG. 2, the fastening system 100 may further include a strap 112. In the example embodiment of FIG. 2, the strap 112 includes a first end 114 and a second end 118. The first end 114 includes a first aperture 110, which mirrors the aperture 104 of the base portion 102. The second end 118 of the strap 112 includes a second aperture 116. And, between the first aperture 110 and the second aperture 116, the strap 112 includes a third aperture 120. While the third aperture 120 is disposed between the first aperture 110 and the second aperture 116, the third aperture 120 is located near the first end 114 of the strap. In an illustrative example, a user places an item within the receiving portion 106 of the base portion 102. The user then may use the strap 112 to secure the item to the base portion 102. Namely, the third aperture 120 of the strap 112 secures to the first protruding notch 122 of the base portion 102. The strap 112 extends over the item and the second aperture 116 of the strap 112 secures to the second protruding notch 124 of the base portion 102. As detailed above, the strap 112 and the base portion 102 are configured to allow a user to easily adjust the strap 112 to release or secure the item from the fastening system 100.

Figure 3:
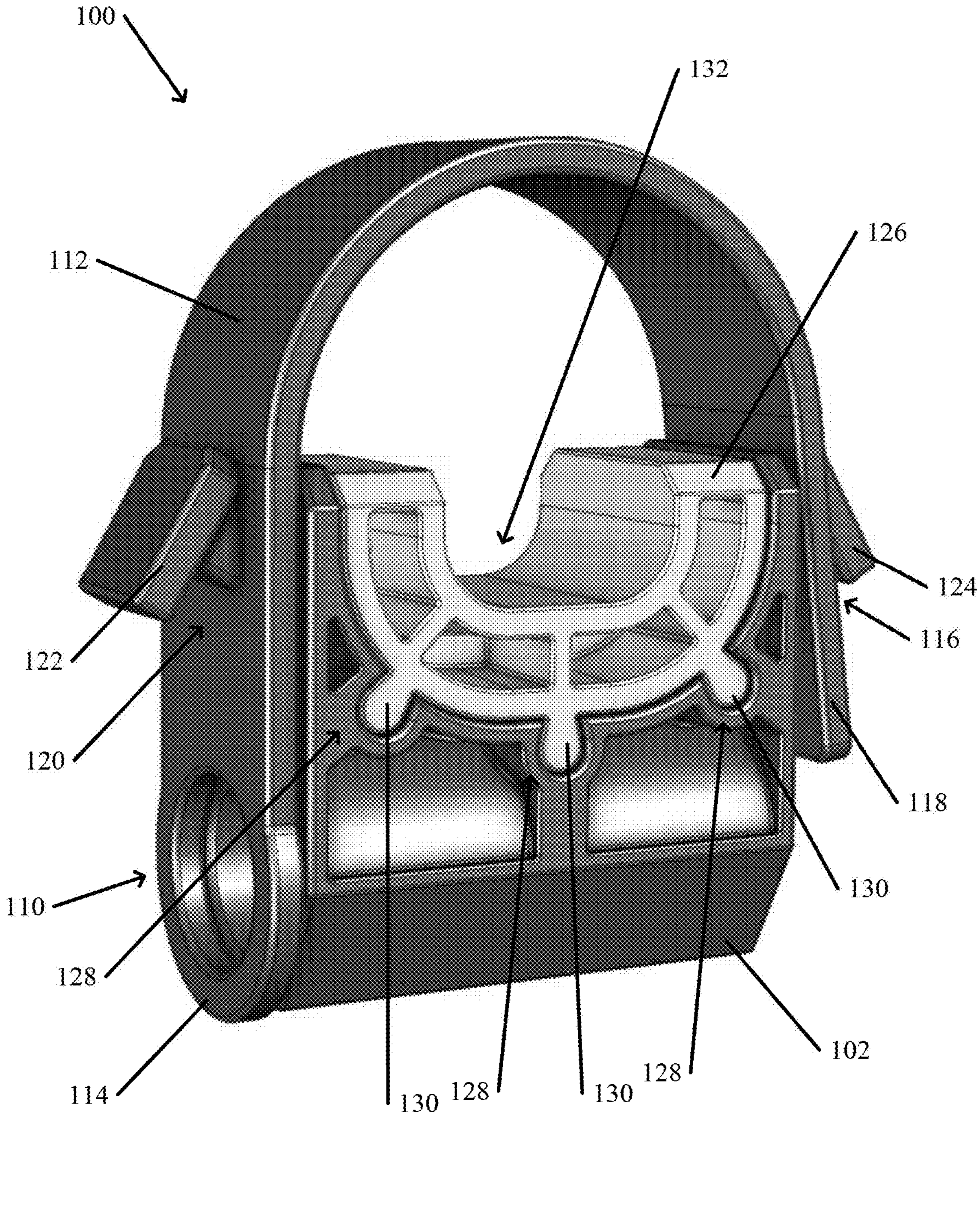
FIG. 3 is a perspective view of an example embodiment of a fastening system having an insert according to the present disclosure.
Figure 4:
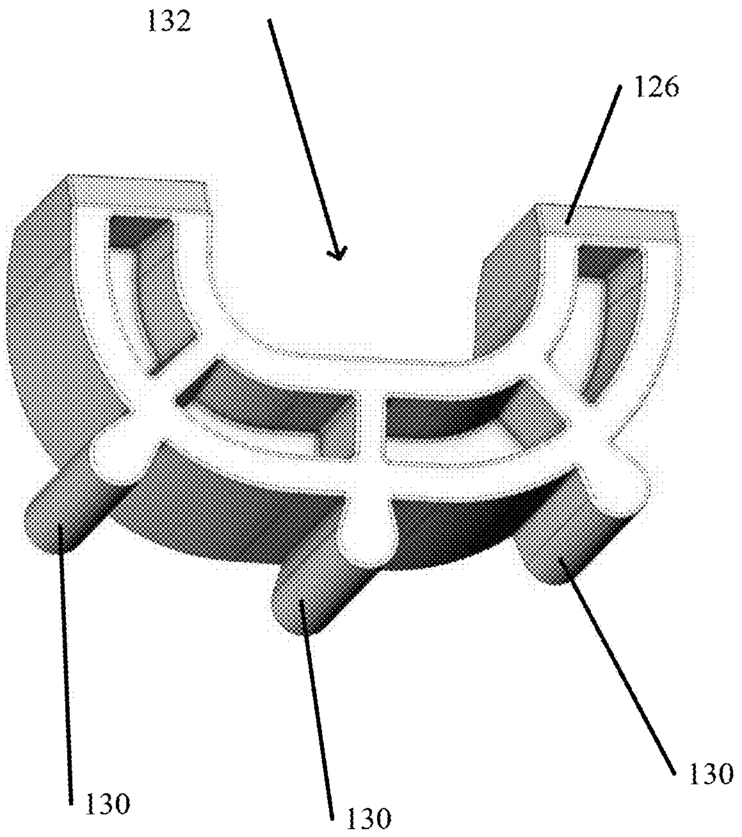
FIG. 4 is a bottom perspective view of an example embodiment of an insert according to the present disclosure.

FIG. 3 is a perspective view of an example embodiment of a fastening system having an insert according to the present disclosure. As shown in FIG. 3, the fastening system 100 may further include an insert 126. The base portion 102 slidably accepts the insert 126. In one example embodiment, the base portion 102 includes a plurality of channels 128 adjacent to the receiving portion 106. The insert 126 includes a plurality of notches 130, which engage the plurality of channels 128 of the base portion 102. The insert 126 is also shown in FIG. 4 without the base portion 102 or the strap 112. As introduced, the insert 126 includes a plurality of notches 130. The plurality of notches 130 may have a bulbous shape, such that the plurality of notches 130 cannot be pulled out of the plurality of channels 128. In example embodiments, the shape or the surface of each of the plurality of notches 130 may be varied to provide additional security. In one example, the surface of each of the plurality of notches 130 may include indentations that engage bumps or ridges in the plurality of channels 128, or vice versa, to provide a more secure connection.

Referring back to FIG. 3, a user may slide the insert 126, via the plurality of notches 130, into the plurality of channels 128 of the base portion 102. In many embodiments, the connection between the insert 126 and the base portion 102 may be varied. For example, the base portion 102 may be configured to provide a snap-fit for the insert 126. And, by using the fastening system 100 with the insert 126, the receiving portion 106 is altered, and thus the fastening system 100 may accommodate different items of various shapes and sizes.

For example, as introduced above, the base portion 102 of the fastening system 100 includes a receiving portion 106. When a user couples the insert 126 to the base portion 102 of the fastening system 100, the receiving portion 106 of the base portion 102 is covered. When the insert 126 is used within the fastening system 100, the insert 126, rather than the base portion 102, provides a receiving portion 132 to receive an item. With such configuration, a fastening system 100 may be quickly adjusted with an insert to accommodate various items without replacing the entire fastening system 100. It should be appreciated that the receiving portion 132 of the insert 126 is not required to have a similar shape to the receiving portion 106 of the base portion 102. Rather, it may be advantageous for the receiving portion 132 of the insert 126 to have a different shape than the receiving portion 106 of the base portion 102 to accommodate different items.

In one example, a user may secure an item having a shaft in the form of a cylindrical tube with the fastening system 100. As described above, the receiving portion 106 of the base portion 102 may be a semi-circle. Such configuration would provide a complementary receiving portion 106 for the cylindrical tube. However, it may be desirable to secure a different item, having a different form shape than a semi-circular form. The item may have a rectangular shaft. Rather than replacing the fastening system 100 or having the shape of the item render the fastening system 100 unusable, a user may couple the insert 126 to the fastening system 100 to provide a different shaped receiving portion 132, better configured to accept the rectangular shape.

In another example, a user may desire to secure various items having the same shape with different sizes. As shown in FIG. 1, the fastening system 100 may accommodate a tube, which contacts the receiving portion 106 of the base portion 102. However, smaller tubes may not fully contact the receiving portion 106 of the base portion 102. Further, the strap 112 may be inadequate to secure the item to the fastening system 100. In other words, based on the diameter of the tube, the item may move around, even if the fastening system 100 is fully secured. This would be undesirable in many applications and negatively impact security. While the fastening system 100 can be used in any number of applications, the following illustrative description and figures apply the fastening system 100 to a bicycle rack attached to a vehicle. An example bicycle rack is described in PCT/2022/032197, entitled "A bicycle rack for a vehicle," owned by the assignee of the present application, the entire contents of which are hereby incorporated by reference.

Figure 5:
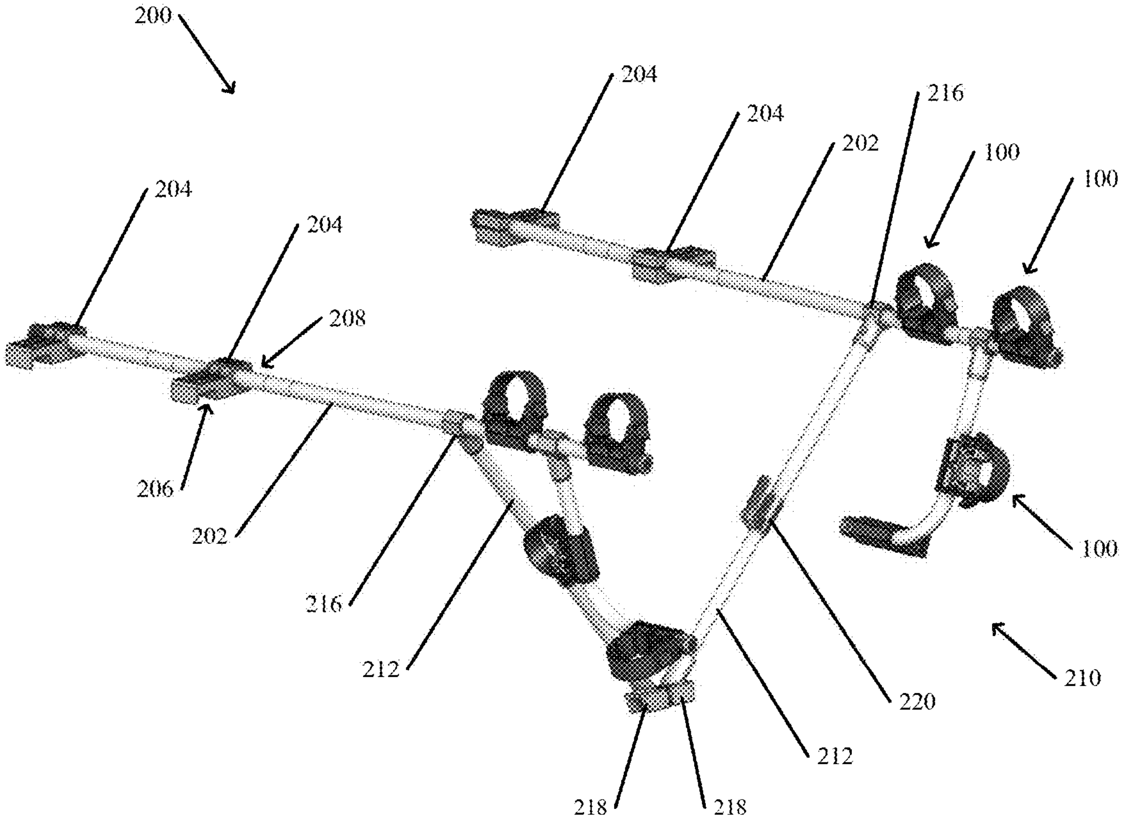
FIG. 5 is a perspective view of an example embodiment of a bicycle rack having a fastening system according to the present disclosure.

FIG. 5 is a perspective view of an example embodiment of a bicycle rack having a fastening system according to the present disclosure. As described herein, the bicycle rack 200 shown in FIG. 5 is referred to as the rack 200. In various embodiments, the rack 200 is configured to attach to a roof of a vehicle and to mount at least one bicycle behind the vehicle (or at the side thereof, depending on the implementation). The rack 200 may be adjustable between a stowed position and a bicycle carrying position. More specifically, the rack 200 can be retracted when not in use and stored on top of the roof of the vehicle, thereby accommodating and not impeding vehicle doors used to access its storage compartment.

As shown in FIG. 5, the rack 200 includes a pair of elongated sliding members 202. Throughout this description, the pair of elongated sliding members 202 is referred to as tubes 202. Each tube 202 is configured to be connected to a component on a roof of a vehicle or vehicle canopy. In an example, this component may be a roof rail or a roof bar. The rack 200 may further includes a set of guides 204. In a number of embodiments, two guides 204 are used to mount each tube 202. The guides 204 are spaced along the length of the vehicle, securing the tubes 202 to the rail or bar. Each guide 204 may comprise two portions allowing it to fulfill two functions. More specifically, each guide may comprise a clamping portion defining a clamp 206 at one end thereof and a guiding section defining a guide slot 208 at the other end thereof. Each tube 202 is slidably inserted through the guide slots 208 of each guide 204. The clamps 206 of each guides are configured to mount the tube 202 to a rail, cross-bar, or the like, such that the tube 202 can slide in parallel with and relative to the rail, cross-bar, or the like.

In an example embodiment, each sliding tube 202 has, at a bicycle receiving end region 210 thereof, at least one fastening system 100 as described in reference to FIGS. 1 to 3. As shown in an example embodiment of FIG. 5, the bicycle receiving end region 210 may include multiple fastening systems 100. The fastening systems 100 are spaced apart along the length of the tube 202 to accommodate more than one bicycle. For example, with two fastening systems 100 properly spaced on each tube 202, the rack 200 could accommodate two bicycles.

The rack 200 may further include a pair of telescopic arms 212. Each telescopic arm 212 has a first end which is pivotably connected to a respective tube 202 via a connector 216. In an example, each telescopic arm 212 is fixed in position along the length of the tube 202, but is pivotable about the lengthwise axis of the tube 202. Each telescopic arm 212 also includes a second end, which defines a rack securing element 218. The rack securing elements 218 terminate in U-shaped formations, as shown in FIG. 5. The rack 200 may also include locking elements 220 along the length of each telescopic arm 212, allowing the telescopic arms 212 to be adjusted between an unlocked condition in which it is telescopic, i.e. it can be extended and retracted, and a locking condition in which its length cannot be adjusted. In many embodiments, locking elements 220 are cam lever clamps or collet-type clamps.

Figure 6:
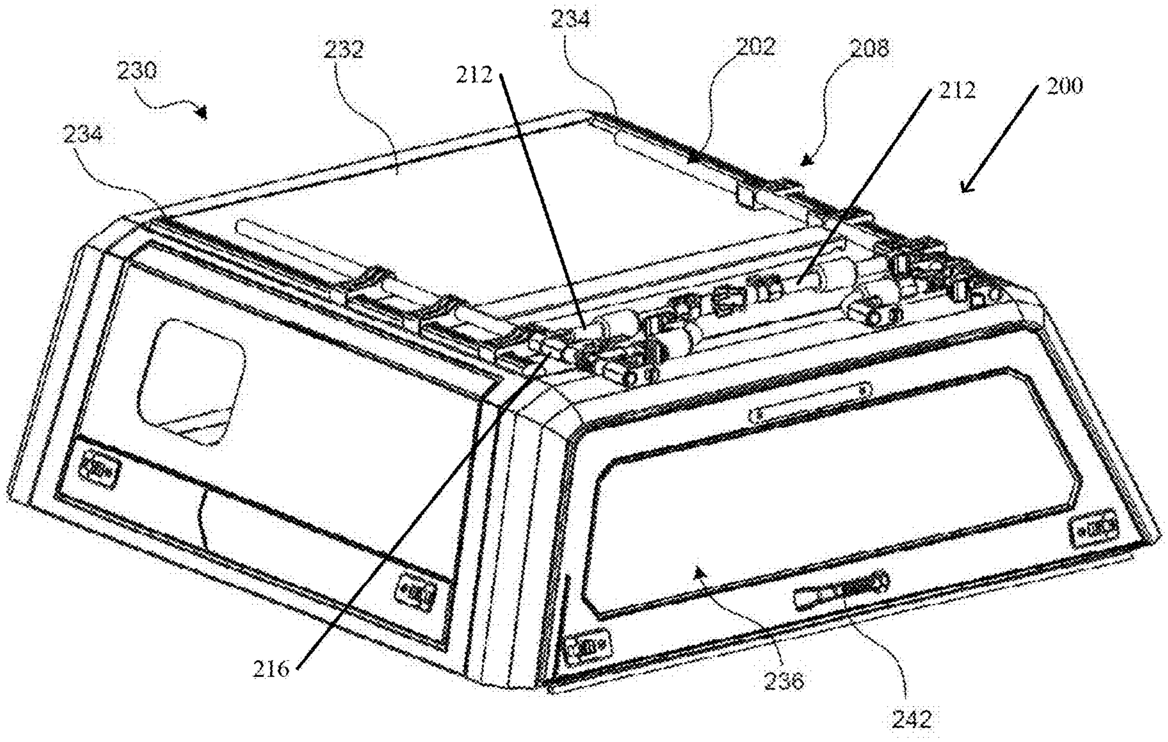
FIG. 6 is a perspective view of an example embodiment of a bicycle rack installed on a vehicle canopy in a stored position according to the present disclosure.

FIG. 6 is a perspective view of an example embodiment of a bicycle rack installed on a vehicle canopy in a stored position according to the present disclosure. Referring to FIG. 6, the rack 200 is installed on a vehicle canopy 230. The vehicle canopy 230 includes a roof 232 having roof rails 234 and a rear door 236 having a rear door handle 242. When the rack 200 is installed on the vehicle canopy 230, the tubes 202 of the rack 200 connect to their respective roof rails 234 via the guide slots 208. As introduced above, the guide slots 208 are clamped to the roof rails 234 such that the guide slots 208 of the guides 204 are positioned inside, i.e. towards the center of the roof 232. Accordingly, the tubes 202 are spaced apart and oriented in parallel with the roof rails 234. To adjust the rack 200 between the stored position, as shown in FIG. 6, and a bicycle carrying position, as shown in FIG. 7, a user can slide the tubes 202 along their length.

In the stored position, the tubes 202 are displaced (slid or pushed in the direction of a front of the vehicle canopy) such that substantially the entire length of each tube 202 is positioned on top of the roof 232. The guide 204 closest to the bicycle receiving end region 210 limits displacement of the tubes 202 as the connector 216 cannot fit through the guide slot 208. Furthermore, the telescopic arms 212 are pivoted upwardly and retracted such that they lie in the same plane as the tubes 202 and extend perpendicularly to the tubes 202 across the width of the roof 232, with the rack securing elements 218 meeting each other in the middle of the roof 232 (along its width). As a result, in the stored position, the rack 200 can be safely and securely stowed on top of the roof 232 when the rack 200 is not carrying bicycles, and the vehicle canopy 230 can be used in the normal way, e.g. its rear door 236 can be opened without the rack 200 impeding access to the internal storage area of the vehicle canopy 230. Further, in the stored position, the rack 200 is very low profile which may have added benefits, e.g. a roof rack may be installed on the roof rails 234 with the rack 200 being stored below the roof rack.

Figure 7:
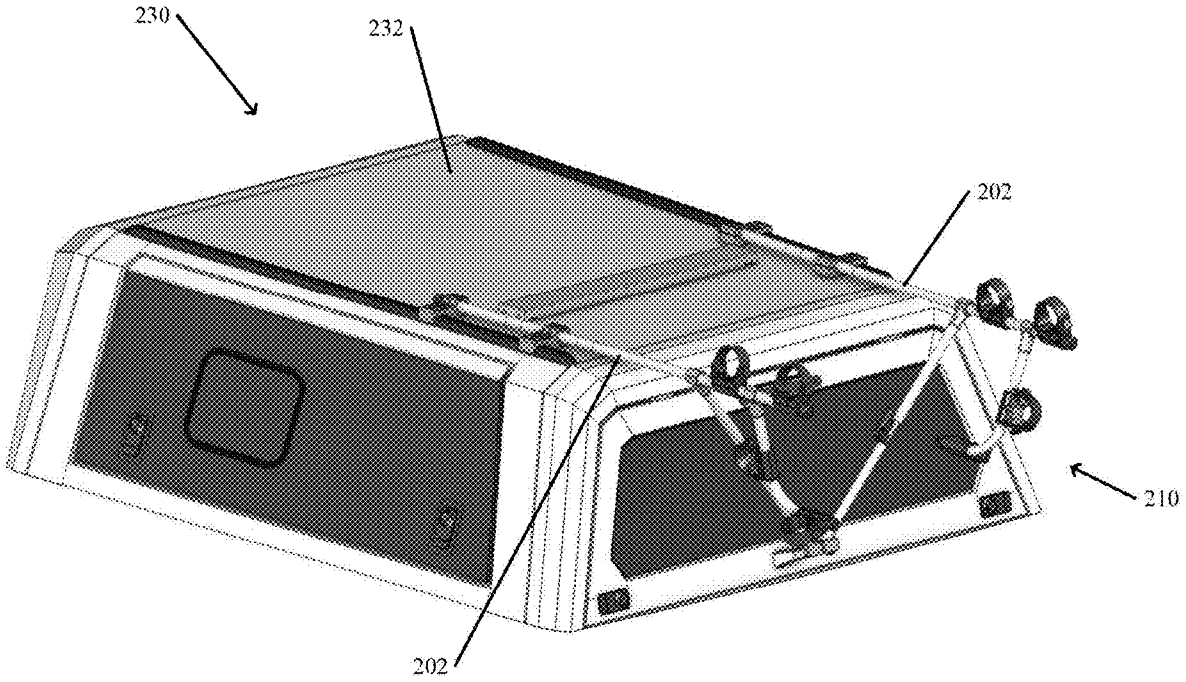
FIG. 7 is a perspective view of an example embodiment of a bicycle rack installed on a vehicle canopy in a bicycle carrying position according to the present disclosure.
Figure 8:
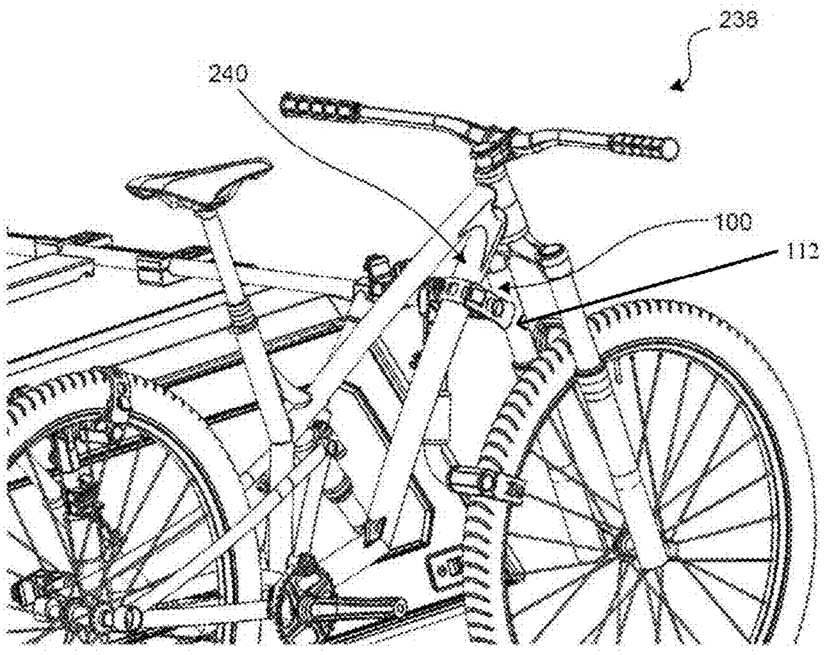
FIG. 8 is a perspective view of an example embodiment of a bicycle on a bicycle rack installed on a vehicle canopy according to the present disclosure.

FIG. 7 is a perspective view of an example embodiment of a bicycle rack installed on a vehicle canopy in a bicycle carrying position according to the present disclosure. To move the rack 200 into the bicycle carrying position, the sliding tubes 202 are pulled/slid out in the direction of the rear of the vehicle canopy 230, such that a section of each sliding tube 202 extends beyond the roof 232. In this way, the bicycle receiving end region 210 clears the roof 232 and is able to receive a bicycle. In an example, and as shown in FIG. 8, a bicycle 238 is mounted such that a part of its frame 240 is secured to each tube 202 via a fastening system 100. As introduced above, the fastening system 100 may further include a strap 112. A user may also use an insert (not shown in FIG. 8) to accommodate different items, or types and sizes of bicycles.

For example, an electric bike may include a larger frame to accommodate additional components, including a battery or control system. Referring to FIGS. 3, with the larger frame, the fastening system 100, and specifically the receiving portion 106 of the base portion 102, must provide a suitable area to accept the larger frame. However, increasing the size of the receiving portion 106 may negatively impact the security of the fastening system 100 to accept a bicycle with a smaller frame. As detailed above, a smaller frame may not fully contact the receiving portion 106 of the base portion 102, and the strap 112 may be inadequate to secure the item to the fastening system 100. In other words, without proper securement, the bicycle with a smaller frame may move within the fastening system 100. Accordingly, a user may adjust the fastening system 100 with an insert. With the insert 126, the receiving portion 132 is adjusted, which can accommodate the bicycle with a smaller frame.

The many features and advantages of the present disclosure are apparent from the written description, and thus, the appended claims are intended to cover all such features and advantages of the disclosure. Further, since numerous modifications and changes will readily occur to those skilled in the art, the present disclosure is not limited to the exact construction and operation as illustrated and described. Therefore, the described embodiments should be taken as illustrative and not restrictive, and the disclosure should not be limited to the details given herein but should be defined by the following claims and their full scope of equivalents, whether foreseeable or unforeseeable now or in the future.

The invention is claimed as follows:

1. A bicycle rack, comprising:

a pair of elongated members;

a plurality of connecting elements for slidably connecting the pair of elongated members to a roof of a vehicle;

a pair of telescopic arms, wherein each one of the pair of telescopic arms comprises a first end connected to a respective one of the pair of elongated members; and a fastening system, comprising:

a base portion having an upper portion and a lower portion, and an insert, wherein the insert includes a plurality of notches configured to slidably engage a plurality of channels of the base portion, wherein the bicycle rack can be adjusted between a stored position and a bicycle carrying position, and wherein, in the stored position, the pair of elongated members is positioned on top of the roof and the pair of telescopic arms is retracted.

2. The bicycle rack of claim 1, wherein the fastening system further comprises: a strap having a first aperture on a first end and a second aperture on a second end.

3. The bicycle rack of claim 2, wherein the base portion further comprises a first notch and a second notch, wherein the first notch is configured to engage the first aperture of the strap, and wherein the second notch is configured to engage the second aperture of the strap.

4. The bicycle rack of claim 3, wherein the first notch and the second notch are disposed on the upper portion of the base portion.

5. The bicycle rack of claim 1, wherein an aperture extends through the lower portion of the base portion.

6. The bicycle rack of claim 1, wherein, in the bicycle carrying position, a section of each one of the pair of elongated members extends beyond the roof, such that a bicycle receiving end region is configured to receive a bicycle, and the pair of telescopic arms extend downwardly to permit a rack securing element to mate with an external surface of the vehicle below the roof.

7. The bicycle rack of claim 6, wherein the external surface is a rear door handle.

8. The bicycle rack of claim 1, wherein the roof of the vehicle is a roof of a vehicle canopy.

9. The bicycle rack of claim 1, wherein the bicycle rack, when in the stored position, is clear of a rear storage compartment of the vehicle.

10. The bicycle rack of claim 1, wherein each one of the pair of elongated members are tubes.

11. The bicycle rack of claim 1, wherein the plurality of connecting elements are a plurality of guides having a clamping portion for clamping each one of the plurality of guides to a rail and a guiding section, which slidably receives one of the pair of elongated members.

12. The bicycle rack of claim 1, wherein the bicycle rack is configured to receive two bicycles.

* * * * *